United States Patent
Kopp et al.

(10) Patent No.: US 6,678,297 B2
(45) Date of Patent: Jan. 13, 2004

(54) CHIRAL LASER UTILIZING A QUARTER WAVE PLATE

(75) Inventors: Victor Il'ich Kopp, Flushing, NY (US); Azriel Zelig Genack, New York, NY (US)

(73) Assignee: Chiral Photonics, Inc., Clifton, NJ (US)

(*) Notice: Subject to any disclaimer, the term of this patent is extended or adjusted under 35 U.S.C. 154(b) by 0 days.

(21) Appl. No.: 09/812,457

(22) Filed: Mar. 20, 2001

(65) Prior Publication Data
US 2001/0036212 A1 Nov. 1, 2001

Related U.S. Application Data
(60) Provisional application No. 60/190,726, filed on Mar. 20, 2000.

(51) Int. Cl.[7] .............. H01S 5/00; H01S 3/14; H01S 3/20; H01S 3/08
(52) U.S. Cl. .............. 372/43; 372/39; 372/98; 372/54; 257/40
(58) Field of Search .............. 372/43, 39, 98, 372/54; 257/40

(56) References Cited

U.S. PATENT DOCUMENTS 6,218,061 B1 * 4/2001 Hanna et al. ............ 430/58.05

2002/0118710 A1 * 8/2002 Kopp et al. ............ 372/7

FOREIGN PATENT DOCUMENTS

JP 4-131833 * 5/1992

* cited by examiner

Primary Examiner—Eddie Lee
Assistant Examiner—Joseph Nguyen
(74) Attorney, Agent, or Firm—Edward Etkin, Esq (57) ABSTRACT

The inventive chiral laser achieves lasing by placing an electro-luminescent emitting layer with quarter wave plate properties and a layer of cholesteric liquid crystal (CLC) between two electrodes. The electrode connected to the emitting layer is highly reflective and serves as a source of electrons, while the second electrode, connected to the hole-transporting CLC, serves as a source of holes. The recombination of electrons and holes in the emitting layer produces luminescence. If a right handed CLC structure is used, then right circularly polarized emission is reflected from the CLC as right circularly polarized light, and then converted to linear polarized light by passing through quarter wave plate emitting layer. It is then reflected by the electrode and converted again into the right circularly polarized light in a second pass through the quarter wave plate emitting layer. The emitted and reflected light emissions are incrementally amplified on each pass through the emitting layer and thus a laser cavity is formed. Once a predefined lasing threshold is reached, lasing occurs perpendicular to the CLC layer. Because the laser cavity is formed only for right circularly polarized light, polarized laser emission will occur.

35 Claims, 6 Drawing Sheets

CHIRAL LASER UTILIZING A QUARTER WAVE PLATE

RELATED APPLICATION

This application claims priority from U.S. Provisional Patent Application Ser. No. 60/190,726 entitled "Chiral Laser With a Quarter Wave Plate" which was filed on Mar. 20, 2000.

FIELD OF THE INVENTION

The present invention relates generally to lasers based on periodic structures, and more particularly to periodic chiral lasers utilizing a single chiral element.

BACKGROUND OF THE INVENTION

Semiconductor coherent laser beam sources have found many industrial and commercial applications in recent years. For example, lasers are used in telecommunications, in optically readable media pickups that are used in CD players, CD ROM drives and DVD players, and in medical imaging. In particular, wide area coherent lasers would be very useful in holographic displays, in communication systems and in information processing. However, previously known semiconductor lasers have a number of disadvantages. For example, traditional semiconductor lasers, such as ones used in CD players, emit light from the edge of a chip, so it is necessary to cleave a wafer into chips and package the chip before knowing if the laser functions properly. Other types of light sources, such as LEDs do not provide the performance needed for certain applications.

Vertical Cavity Surface Emitted Lasers (hereinafter "VCSELs") have been developed to address the need for a more advanced, higher quality laser that can function well in a variety of applications. VCSELs have superior performance to edge-emitting lasers but at a significantly greater cost. VCSELs emit light vertically from the wafer surface, like LEDs. As a result, their fabrication and testing is fully compatible with standard I.C. procedures and equipment, so that arrays of VCSELs are feasible. Additionally, VCSELs are much faster, more efficient, and produce a smaller divergence beam than LEDs.

The VCSEL structure leads to a host of performance advantages over conventional semiconductor lasers.

1) small size
2) low power consumption
3) Two-dimensional array capabilities

In contrast to conventional edge-emitting semiconductor lasers, surface-emitting VCSELs have a radially symmetric Gaussian near-field, greatly simplifying coupling to optical elements or fibers. In addition, VCSEL technology allows the fabrication of two-dimensional laser arrays.

However, VCSELs suffer from a number of disadvantages. The manufacture of VCSELs requires sophisticated and expensive microfabrication. Since single-pass gain in thin layer semiconductor lasers is low, VCSELs incorporate highly reflective dielectric stacks which are integrated into the laser as Bragg reflectors. These consist of alternating layers of dielectric material, which are grown using methods of molecular beam epitaxy (MBE). This ensures a close match of the atomic lattice structures of adjacent layers. Alternating atomically ordered layers of materials with different electronic characteristics are thereby produced. The interfaces between the layers must be digitally graded and doped to reduce the electrical resistance.

Much work has been done to improve the performance of VCSELs by increasing the number of layers and/or the dielectric constant contrast between alternating layers. However, this approach makes the fabrication more expensive and difficult. There is also a limit to the number of layers determined by the absorption in these layers. While VCSELs can be manufactured in two-dimensional arrays, there has been great difficulty in achieving uniform structure over large areas and in producing arrays of large area. The materials typically used for VCSELs do not have the desired low absorption and high index contrast over a broad frequency range. In particular, it is difficult to achieve high reflectivity in the communication band around 1.5 microns.

In addition, VCSELs cannot be tuned in frequency since their periods cannot be changed. The density of photon modes is not changed appreciably by use of multilayer Bragg reflector with low refractive index contrast and the gain cannot be improved in a VCSEL system. Also, an external device must be used to control the polarization of the light.

Periodic chiral structures may be advantageously substituted for VCSELs to maximize performance and reduce device cost and complexity. One advantageous chiral structure utilizes an electro-luminescent emitter layer sandwiched between two cholesteric liquid crystal layers, that are in turn sandwiched between two electrodes connected to a current source. Several advantageous embodiments of such a structure are disclosed in the commonly assigned U.S. patent application Ser. No. 09/468,148, entitled "Chiral Laser Apparatus and Method". However, a laser with two CLC layers suffers from some drawbacks. First, in such a two-CLC structure, at least one of the CLC layers must be polymeric making it difficult to produce long range correlation in the CLC structures. Second, in certain applications, such as when the chiral laser is integrated together with Thin Film Transistors into a device, direct access to one side of the emitting layer is difficult or impossible to achieve.

It would thus be desirable to provide a periodic laser apparatus and method that produces a coherent laser beam utilizing only a single chiral layer.

SUMMARY OF THE INVENTION

This invention relates to use of a single chiral structure combined with an excitable light-emitting material and a quarter wave plate to produce coherent lasing with performance similar to that of an ideal two chiral layer laser. Lasing action from the inventive chiral laser is achieved by placing an electro-luminescent emitting layer with properties of a quarter wave plate adjacent to a layer of a chiral material, for example, a cholesteric liquid crystal (CLC), between two electrodes. The electrode connected to the quarter wave plate emitting layer is highly reflective and serves as a source of electrons (for example, an aluminum electrode), while the second electrode, connected to the hole-transporting CLC, is a source of holes. An external current source is connected to the electrodes, and when a current is passed between the electrodes, the reflecting electrode releases electrons into the emitting layer, while the second electrode releases holes that are transported by the chiral layer into the emitting layer. Because the laser beam will be transmitted through the second electrode, the second electrode is preferably transparent. The recombination of electrons and holes in the emitting layer produces luminescence that initiates lasing. Optionally, the emitting layer can be optically excitable rather than electro-luminescent in which case the reflective electrode is replaced by a mirror layer while the second electrode is eliminated. Excitation of the emitting layer is produced by optical pumping. In alternate embodiments of the invention, the emitting quarter wave plate layer is composed of a separate quarter wave plate and an emitting layer.

The essence of the inventive chiral laser is that light emissions from the emitting layer oscillate between the CLC and the reflective electrode (or mirror) and repeatedly pass through the quarter wave plate emitting layer with a closed photon trajectory due to the quarter wave plate properties of the emitting layer and are incrementally amplified by the emitting layer resulting in lasing emission through the CLC layer.

The inventive apparatus and method advantageously overcome the drawbacks of previously known chiral lasers in that only a single chiral layer is utilized, greatly simplifying construction and reducing the cost. Furthermore, the inventive laser allows access to one side of the emitting layer—a feature important in many applications.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote elements throughout the several views.

DETAILED DESCRIPTION OF PREFERRED EMBODIMENTS

Before describing the present invention in greater detail, it would be helpful to provide definitions of common terms utilized in the dielectric lasing art. "Chiral" materials are materials which are not identical to their mirror image. Cholesteric materials, such as cholesteric liquid crystals (hereinafter "CLCs"), have multiple molecular layers in which molecules in the different layers are oriented on average in the same direction and at a slight angle relative to molecules in adjacent layers. Thus, the average direction of the molecules, known as a "director", rotates helically throughout the cholesteric material. A pitch of a cholesteric material is defined as a thickness of material in which the director rotates a full 360 degrees. Cholesteric structures also have a property called "handedness"—they may be right-handed or left-handed depending on the direction of rotation of the molecules from layer to layer. The handedness of a cholesteric structure influences the circular polarization and amplitude of light passing through the structure.

Periodic dielectric structures (such as layered structures with varying dielectric constants or chiral structures) have a particular reflection band (hereafter referred to as a "photonic stop band") which is the result of its periodic structure—a range of wavelengths for a given polarization of light where there is no transmission of light through the structure due to reflection. At the edge of the photonic stop band, there are a series of narrow photonic states (or modes) at the peak of which transmission of light reaches unity. The spectral width of these states is proportional to the inverse of the dwell time for the photons within the periodic medium. The long dwell time of photons in spectrally narrow states facilitates lasing at the frequency of these modes in activated materials since emitted photons are given greater opportunity to stimulate emission before they emerge from the periodic medium. Since the photon lifetime is longest for the state closest to the edge of the photonic stop band (the stop band being centered at frequency $F_c$) and falls rapidly with state number from the edge, lasing occurs in the wavelength corresponding to the first state or corresponding to a few states closest to the photonic stop band edge. In this case lasing is enhanced when the peak of the emission frequency overlaps the frequency at the band edge $F_e$. This is taught by the commonly-assigned "Stop Band Laser" patent application of A. Z. Genack et al. (Ser. No. 09/302,630, filed Apr. 30, 1999) which discloses that, in a generally homogeneous CLC structure, lasing advantageously occurs at the edges of the photonic stop band due to long dwell time of photons therein.

When a defect, such as a spacing, pitch shift, or additional layer of a foreign substance is introduced into a periodic structure, or when the periodic structure is a CLC and comprises two or more CLC films with each film rotated relative to the others, or when the CLC films have different pitches or refractive indices, then an additional localized photonic state or number of photonic states may be introduced into the photonic stop band. Maximum efficiency lasing occurs at the frequency of the localized state.

However, there are some inherent difficulties in constructing multiple-layer chiral CLC-based structures. First of all, liquid CLCs cannot be easily utilized in multiple layer arrangements, forcing the use of polymeric CLCs. Liquid CLCs enable significantly better alignment than traditional polymeric CLCs. Second, in chiral lasers, it would be advantageous to have access to at least one side of the emitter component of the laser for easier integration with Thin Film Transistors (TFTs) into devices for use in TFT-based application such as flat screen displays. Furthermore, utilizing multiple CLCs raises the expense of a periodic laser. The inventive apparatus and method enables the use of a single-layer CLC structure as an efficient laser that functions optically in a manner similar to a multiple CLC layer structure. In addition, the single CLC of the inventive structure is bounded on both sides, and as a result, the single CLC may by liquid rather than polymeric. Finally, the inventive apparatus provides access to one side of the emitter of the structure for simplified integration with other components.

Figure 1:
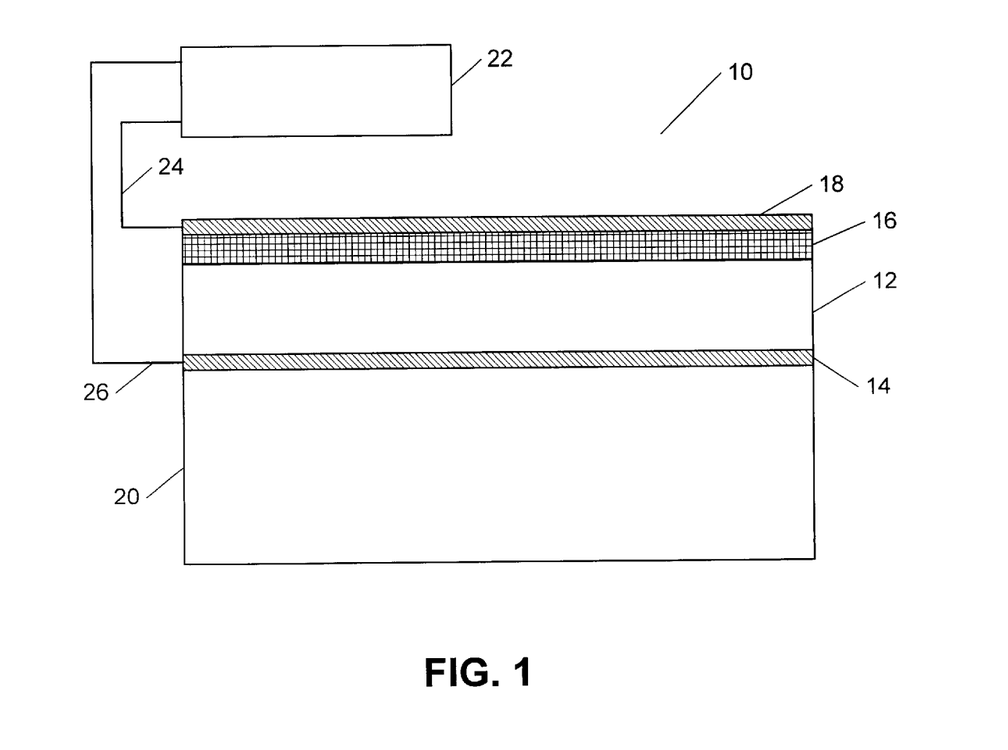
FIG. 1 is a schematic diagram of a preferred embodiment of a chiral laser of the present invention where the chiral laser comprises a single chiral layer and an electrically pumped emitting layer with quarter wave properties.

Referring now to FIG. 1, a preferred embodiment of the inventive single CLC chiral laser 10 is shown. In should be noted that while the inventive chiral laser 10 is described herein with reference to CLCs, any chiral material having similar properties may be substituted for the CLC without departing from the spirit of the invention. The chiral laser 10 includes a CLC layer 12 sandwiched between an anode electrode 14 and an electro-luminescent emitting layer 16 with quarter wave plate qualities (hereinafter: "quarter wave plate emitting layer 16"). The quarter wave plate properties of layer 16 mean that circularly polarized light of a particular orientation passing through one side will be converted into linear polarized light, and linear polarized light passing through the other side will be converted into circularly polarized light of the particular sense of rotation. The particular orientation of circular polarization that becomes converted depends on the configuration of the quarter wave plate. For example, the layer 16 can be configured to convert right circularly polarized light into linear polarized light and vice versa.

The CLC layer 12 is of a predefined thickness $L_{ch}$ and serves as a hole transport material, and may be composed from any class of chiral substance capable of transmitting light, for example, liquid or polymeric CLC. The handedness of the CLC layer 12 (right or left) may be selected as a matter of design choice depending on the desirability of the polarization of laser emission, and does not otherwise affect the operation of the inventive chiral laser 12.

Because charge current must pass through the CLC layer 12, preferably, the CLC layer 12 is substantially conductive. Furthermore since lasing will occur through the anode electrode 14, the anode electrode 14 is preferably substantially transparent. Transparent electrodes are known in the art and may be composed from ITO (Indium Tin Oxide) or from any other substantially transparent highly conductive substances. Furthermore, transparent electrodes of different work functions may be produced by attaching monolayers of molecules to an ITO electrode. The emitting layer 16 may include, but is not limited to: laser dyes, rare earth elements, conjugated polymers or any medium in which electron-hole recombination occurs in the active material. The anode electrode may be of any material that serves as a source of holes.

The total thickness L of the quarter wave plate emitting layer 16 determines the lasing frequency of the chiral laser 10. For $L=n\lambda/4$, where n is an integer and $\lambda$ is the wavelength of light in the quarter wave plate emitting layer 16, lasing occurs at the band edge. On the other hand, for $L=(n\lambda/4)+\lambda/8$, lasing will occur in the center of the stop band. The thickness of the CLC layer 12, $L_{ch}$, and the handedness of the CLC layer 12 determine the polarization of the lasing output. For a thin CLC layer 12, lasing will have the same circular polarization as the sense of rotation of the CLC layer 12. However, for a thicker CLC layer 12, lasing will have the opposite sense of rotation from the sense of rotation of the CLC layer 12. If an intermediate thickness CLC layer 12 is utilized, lasing will be elliptically or even linear polarized. The exact definitions of thin, thick and intermediate $L_{ch}$ thickness depend on the type of CLC used and may be easily determined by one skilled in the art as a matter of design choice.

An example of a set of parameters of the inventive chiral laser 10, which will produce right circular polarized lasing in the middle of the stop band, follows. A combined quarter wave plate and emitting layer 16 with a thickness L=0.73 micron and ordinary and extraordinary refractive indices of 1.5 and 1.7, respectively. A right-handed CLC layer 12 that is 8 microns thick with ordinary and extraordinary refractive indices of 1.52 and 1.58, respectively.

A reflecting electrode 18 is positioned on top of the quarter wave plate emitting layer 16. Preferably, the reflecting electrode 18 is composed of a highly reflective material that serves as a source of electrons. For example, the reflecting electrode 18 may be composed of aluminum. Finally, a transparent substrate 20 (for example, composed of glass) is positioned under the anode electrode 14. The anode electrode 14 and the reflecting electrode 18 are connected to an external electrical power source 22 via lines 26 and 24, respectively. The power source 22 may be any electrical current source capable of providing charge current between electrodes connected thereto.

Figure 3A:
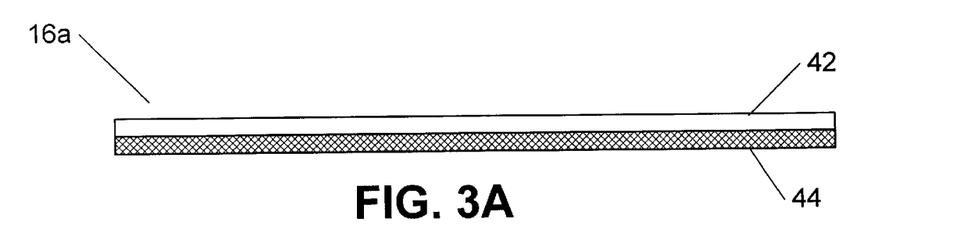
FIGS. 3A and 3B are schematic diagrams of alternate embodiments of the electrically pumped emitting layer of the chiral laser of FIG. 1.
Figure 3B:
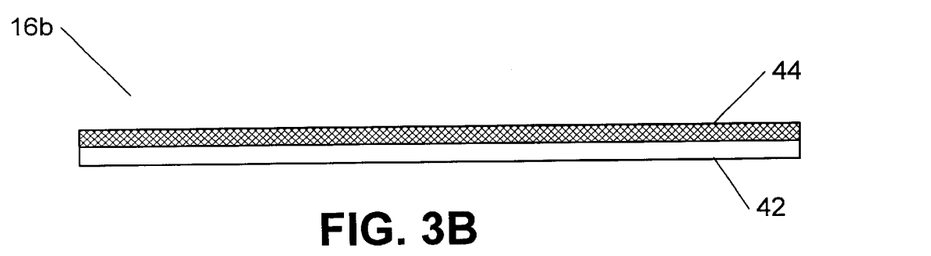

The quarter wave plate emitting layer 16 is preferably configured as a single element having both electro-luminescent emitting properties as well as quarter wave plate properties. Referring to FIGS. 3A and 3B, two alternate embodiments of the quarter wave plate emitting layer 16 are shown. In FIG. 3A, the quarter wave plate emitting layer 16a comprises a top quarter wave plate layer 42 and a bottom electro-luminescent emitting layer 44. The layers 42, 44 may be separate structures or integrated into a single two-layer structure. In FIG. 3B, the quarter wave plate emitting layer 16b comprises a top electro-luminescent emitting layer 44 and a bottom quarter wave plate layer 42. The layers 42, 44 may be separate structures or integrated into a single two-layer structure.

Figure 2:
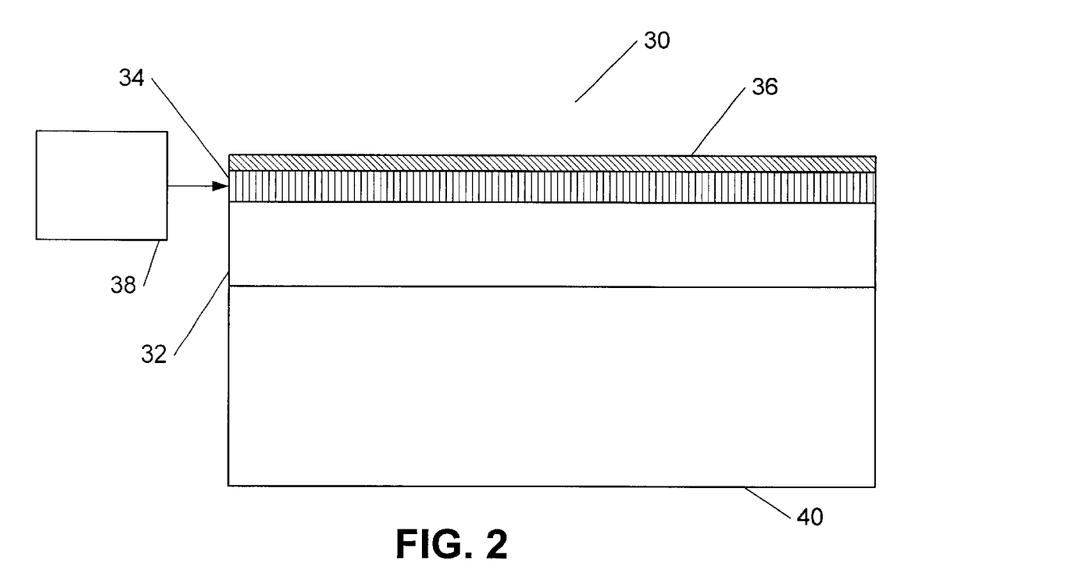
FIG. 2 is a schematic diagram of a second embodiment of the chiral laser of the present invention where the chiral laser comprises a single chiral layer and an optically pumped emitting layer with quarter wave properties.

While the electrically pumped chiral laser 10 provides superior performance, the chiral laser may be configured to be optically pumped as a matter of design choice without departing from the spirit of the invention. Referring now to FIG. 2, a second embodiment of the chiral laser 30 of the present invention is shown where the chiral laser 30 is optically pumped. The chiral laser 30 includes an optically excitable emitting layer 34 with quarter wave plate qualities (hereinafter: "quarter wave plate emitting layer 34") sandwiched between a CLC layer 32 and a reflector 36 such as aluminum mirror. The CLC layer 32 may be composed from any chiral substance capable of transmitting light, for example, liquid or polymeric CLC. The handedness of the CLC layer 32 (right or left) may be selected as a matter of design choice depending on the desirability of the polarization of laser emission, and does not otherwise affect the operation of the inventive chiral laser 30. A transparent substrate 40 is positioned below the CLC layer 32.

The quarter wave plate emitting layer 34 produces gain when subjected to an electromagnetic wave from an electromagnetic wave source 38. The quarter wave plate emitting layer 34 may comprise, but is not limited to: rare earth doped materials, chelated rare earth doped materials, semiconductor materials, organic light-emitting materials, conjugated polymers, dye-doped material, and materials containing color centers. The electromagnetic wave source 38 may comprise, but is not limited to: a laser, a flash lamp, focused sunlight, or a light-emitting diode.

Figure 3C:
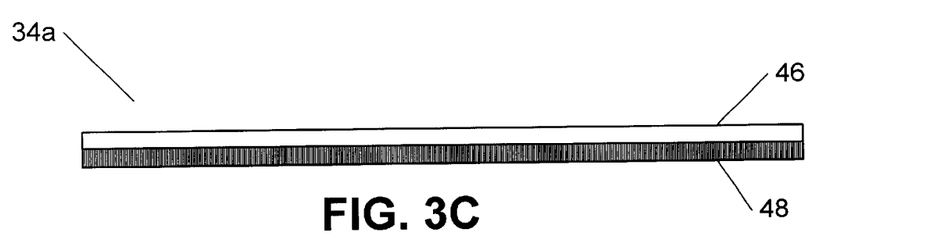
FIGS. 3C and 3D are schematic diagrams of alternate embodiments of the optically pumped emitting layer of the chiral laser of FIG. 2.
Figure 3D:
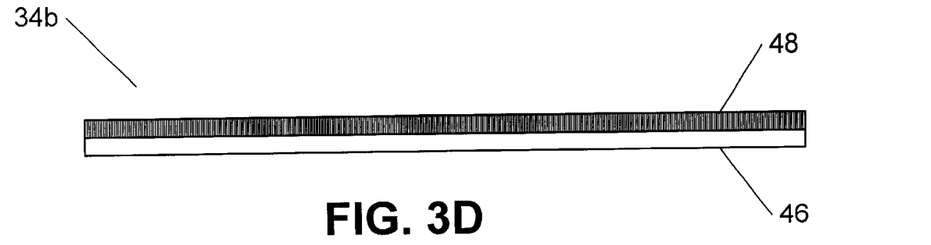

The quarter wave plate emitting layer 34 is preferably configured as a single element having both optically excitable emitting properties as well as quarter wave plate properties. Referring to FIGS. 3C and 3D, two alternate embodiments of the quarter wave plate emitting layer 34 are shown. In FIG. 3C, the quarter wave plate emitting layer 34a comprises a top quarter wave plate layer 46 and a bottom optically excitable emitting layer 48. The layers 46, 48 may be separate structures or integrated into a single two-layer structure. In FIG. 3D, the quarter wave plate emitting layer 34b comprises a top optically excitable emitting layer 48 and a bottom quarter wave plate layer 46. The layers 46, 48 may be separate structures or integrated into a single two-layer structure.

Figure 4:
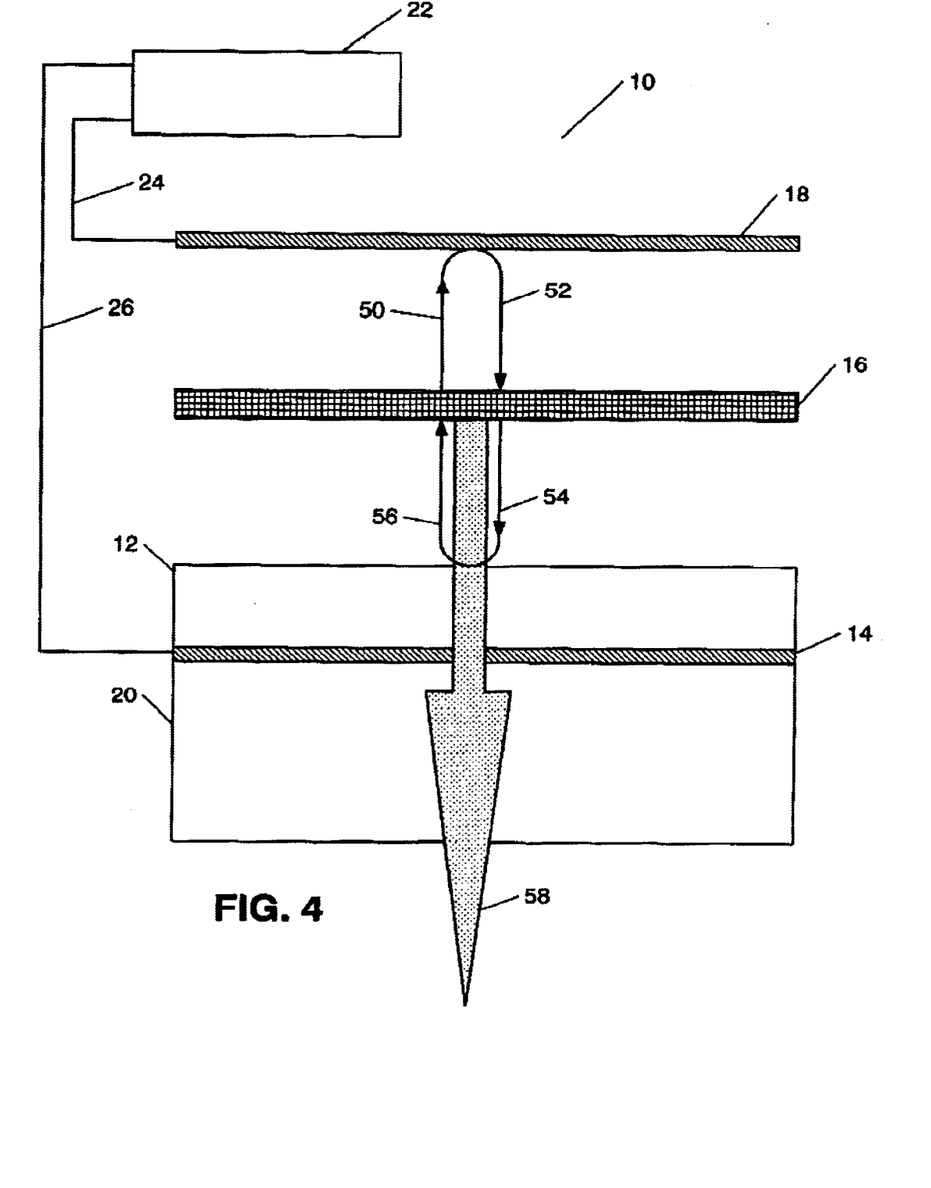
FIG. 4 is a schematic diagram of an expanded view of the inventive chiral laser of FIG. 1 demonstrating operation of the emitting layer with quarter wave properties and chiral layer laser cavity.

Referring now to FIG. 4, to demonstrate the operation of the inventive chiral laser 10 of FIG. 1, an expanded view of a portion of the chiral laser 10 is shown. While the reflecting electrode 18 and the quarter wave plate emitting layer 16 are shown separately from other components of the chiral laser 10, it should be noted that the expanded view is shown by way of example to demonstrate how a laser cavity is formed in the chiral laser 10—the construction of the inventive chiral laser 10 is as shown in FIG. 1. Also, for the purpose of the demonstrative example, the CLC layer 12 is assumed to be a right handed structure. As described earlier, this will result in right circularly polarized laser emission during the operation of the chiral laser 10. A left-handed CLC structure may be used as a matter of design choice without departing from the spirit of the invention.

When the power source 22 delivers an electrical current between the reflecting electrode 18 and the anode electrode 14, a recombination of electrons from the reflecting electrode 18 and holes from the anode layer 14, occurs in the quarter wave plate emitting layer 16 producing luminescence. Linearly polarized light (LPL) emission 50 from the quarter wave plate emitting layer 16 is reflected from the reflecting electrode 18 as reflected LPL emission 50 and is amplified and converted into right circularly polarized light (RCPL) emission 54 after passing through the quarter wave plate emitting layer 16. Because the CLC layer 12 is a right handed structure, RCPL emission 54 is reflected from the CLC layer 12 as RCPL emission 56, and after passing through the quarter wave plate emitting layer 16 is amplified again and converted and added to the LPL emission 50—thus establishing a closed photon trajectory resulting in a laser cavity being formed between the bottom of the CLC layer 12 and the reflecting electrode 18. The cycle of reflected and amplified emission gives rise to lasing when the system is excited above the lasing threshold and polarized lasing emission 58 occurs.

Figure 5:
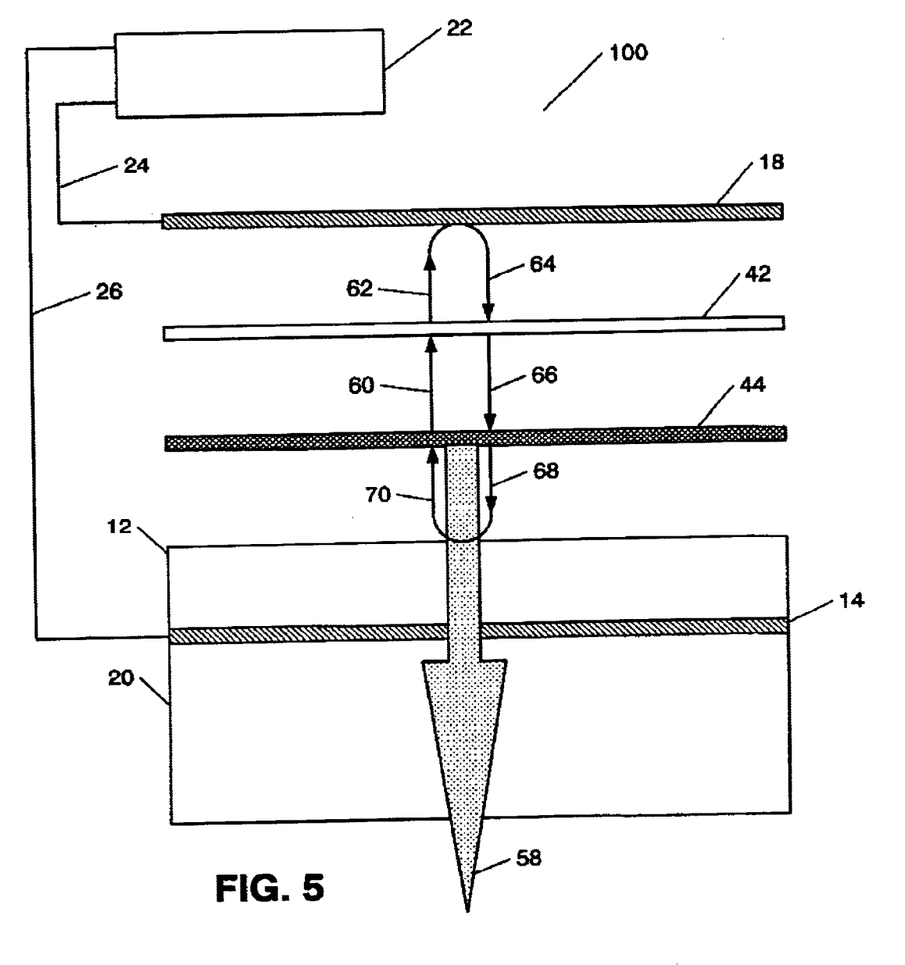
FIG. 5 is a schematic diagram of an expanded view of the inventive chiral laser of FIG. 1 demonstrating operation of the emitting layer with quarter wave properties of FIG. 3A and the chiral layer laser cavity.

Referring now to FIG. 5, to demonstrate the operation of an embodiment of the inventive chiral laser 10 of FIG. 1 utilizing the quarter wave plate emitting layer 16a of FIG. 3A, an expanded view of a portion of a chiral laser 100 is shown. While the reflecting electrode 18, the quarter wave plate 42, and the emitting layer 44 are shown separately from other components of the chiral laser 100, it should be noted that the expanded view is shown by way of example to demonstrate how a laser cavity is formed in the chiral laser 100—the construction of the inventive chiral laser 100 is as shown for chiral laser 10 in FIGS. 1 and 3A. Also, for the purpose of the demonstrative example, the CLC layer 12 is assumed to be a right handed structure. As is described earlier, this will result in right circularly polarized laser emission during the operation of the chiral laser 100. A left-handed CLC structure may be used as a matter of design choice.

When the power source 22 delivers a charge current between the reflecting electrode 18 and the anode electrode 14, a recombination of electrons from the reflecting electrode 18 and holes from the anode layer 14, occurs in the emitting layer producing luminescence. Because the CLC layer 12 is a right handed structure, left circularly polarized light (not shown) emitted from the emitting layer 44 passes through the CLC layer 12, while right circularly polarized light (RCPL) emission 60 is reflected from the CLC layer 12, and after being amplified by the emitting layer 44 and passing through the quarter wave plate 42, is converted into linear polarized light (LPL) emission 62. After the LPL emission 62 is reflected by the reflecting electrode 18 as a LPL emission 64, it is converted into a reflected RCPL emission 66 by the quarter wave plate layer 42 and is then amplified into amplified RCPL emission 68 as it passes through the emitting layer 44. The amplified RCPL emission 68 is reflected from the CLC layer 12 as reflected amplified RCPL emission 70 and after passing through the emitting layer 44 is amplified yet again, joining the RCPL emission 60 and passing through the quarter wave plate 42—thus establishing a closed trajectory resulting in a laser cavity being formed between the bottom of the CLC layer 12 and the reflecting electrode 18. The cycle of reflecting and amplifying emissions continues until the laser threshold is reached and a polarized lasing emission 58 occurs.

Figure 6:
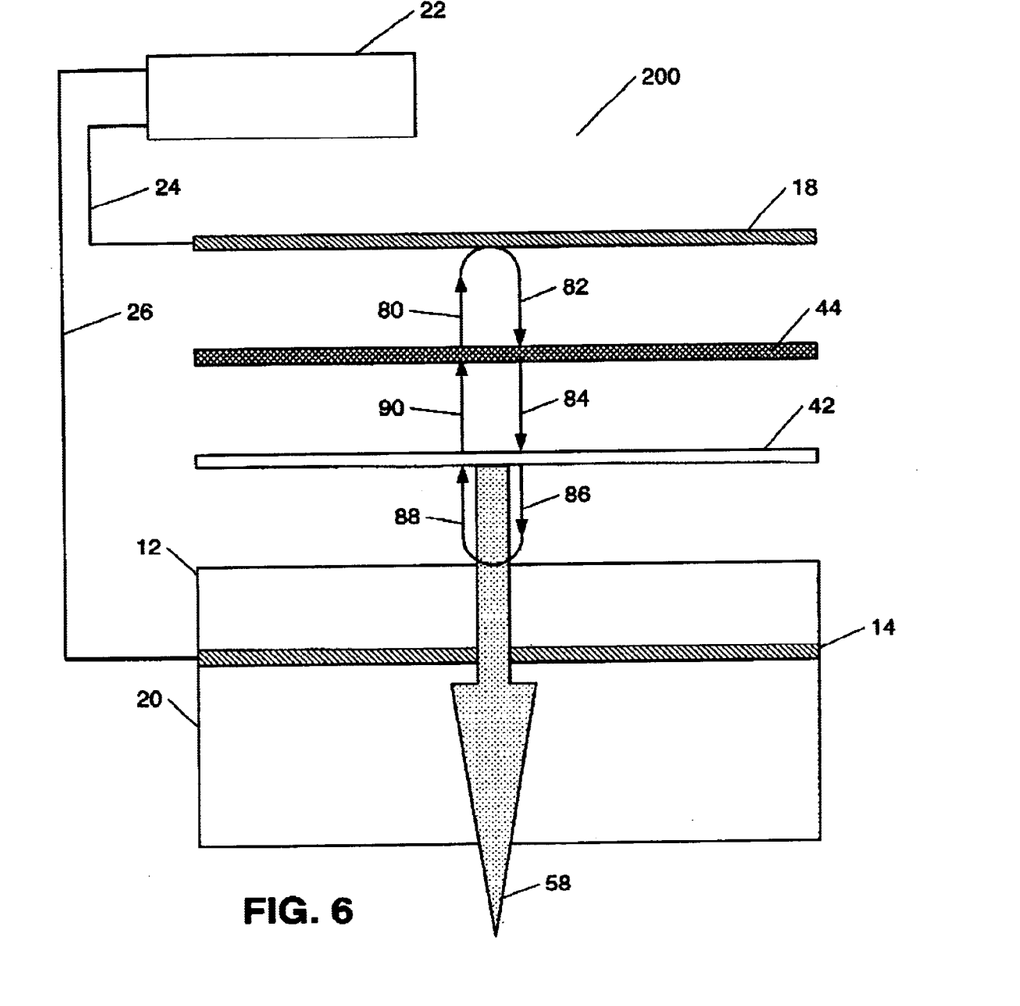
FIG. 6 is a schematic diagram of an expanded view of the inventive chiral laser of FIG. 1 demonstrating operation of the emitting layer with quarter wave properties of FIG. 3B and chiral layer laser cavity.

Referring now to FIG. 6, to demonstrate the operation of an embodiment of the inventive chiral laser 10 of FIG. 1 utilizing the quarter wave plate emitting layer 16b of FIG. 3B, an expanded view of a portion of a chiral laser 200 is shown. While the reflecting electrode 18, the quarter wave plate 42 and the emitting layer 44 are shown separately from other components of the chiral laser 200, it should be noted that the expanded view is shown by way of example to demonstrate how a laser cavity is formed in the chiral laser 200—the construction of the inventive chiral laser 200 is as shown for chiral laser 10 in FIGS. 1 and 3B. Also, for the purpose of the demonstrative example, the CLC layer 12 is assumed to be a right handed structure. As is described earlier, this will result in right circularly polarized laser emission during the operation of the chiral laser 200. A left handed CLC structure may be used as a matter of design choice.

When the power source 22 delivers a charge current between the reflecting electrode 18 and the anode electrode 14, a recombination of electrons from the reflecting electrode 18 and holes from the anode layer 14, occurs in the emitting layer producing luminescence. Linear polarized light (LPL) emission 80 is emitted from the emitting layer 44. After the LPL emission 80 is reflected by the reflecting electrode 18 as a reflected LPL emission 82, it is amplified by the emitting layer 44 into amplified LPL emission 84 that passes through the quarter wave plate 42 and is converted into a right circularly polarized light (RCPL) amplified emission 86. Because the CLC layer 12 is a right handed structure, the RCPL amplified emission 86 is reflected from the CLC layer 12 as a reflected RCPL amplified emission 88, that in turn is converted to a LPL amplified emission 90, and, after passing through the emitting layer 44, is amplified yet again, joining the LPL emission 80—thus establishing a closed trajectory resulting in a laser cavity being formed between the CLC layer 12 and the reflecting electrode 18. The cycle of reflecting and amplifying emissions continues until the laser threshold is reached and a polarized lasing emission 58 occurs.

While examples similar to FIGS. 4–6 are not shown for the optically pumped chiral laser 30 of FIG. 2, it should be noted that the chiral laser 30 operates in a substantially similar manner to the chiral lasers 10, 100 and 300 of FIGS. 4, 5, and 6, respectively, depending on whether the quarter wave plate emitting layer 34, 34a, or 34b is utilized.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps, which perform substantially the same function in substantially the same way to achieve the same results, are within the scope of the invention. It is the intention, therefore, to be limited only as indicated by the scope of the claims appended hereto.

We claim:

1. A chiral laser apparatus comprising:
   a layered structure comprising:
      a chiral layer of a predetermined handedness having a top portion and a bottom portion;
      a quarter wave plate active material layer of a thickness L having a top and a bottom portion, configured to emit electromagnetic radiation when subjected to excitation and disposed above said chiral layer, wherein said active material layer bottom portion is in substantial contact with said chiral layer top portion, and wherein said active material layer is operable to:
         (i) convert circularly polarized electromagnetic radiation passing therethrough to linearly polarized electromagnetic radiation, and
         (ii) convert linearly polarized electromagnetic radiation passing therethrough is to circularly polarized electromagnetic radiation;
      a reflector having a top and a bottom portion, configured to reflect said electromagnetic radiation, coming from said top portion of said active material layer, wherein said reflector bottom portion is in substantial contact with said active material layer top portion; and
   excitation means for applying excitation to said layered structure to produce polarized lasing directed through said chiral layer in a direction away from said active material layer.

2. The chiral laser of claim 1, wherein said active material layer is electro-luminescent, and wherein said reflector comprises a first electrode, said chiral laser further comprising:
   a second electrode, composed of a substantially transparent material, disposed below said chiral layer and in substantial contact with said chiral layer bottom portion, wherein said excitation means comprises power means for delivering a charge current between said first and second electrodes to cause excitation in said active material layer.

3. The chiral laser of claim 1, wherein said active material layer comprises at least one of: laser dyes, rare earth elements, conjugated polymers, and any medium in which electron-hole recombination occurs in an active material to emit light.

4. The chiral laser of claim 2, wherein said first electrode is composed of reflective aluminum.

5. The chiral laser of claim 1, wherein said chiral layer is composed of a cholesteric liquid crystal material.

6. The chiral laser of claim 1, wherein said active material layer is optically excitable and wherein said excitation means comprises optical pump means for delivering electromagnetic wave radiation to said active material layer to cause excitation therein to produce emission.

7. The chiral laser of claim 6, wherein said active material layer comprises at least one of: rare earth doped material, chelated rare earth doped material, semiconductor materials, organic light-emitting materials, conjugated polymers, dye-doped material, and materials containing color centers.

8. The chiral laser of claim 6, wherein said optical pump means comprises one of: a laser, a flash lamp, focused sunlight, and a light-emitting diode.

9. The chiral laser of claim 1, wherein said active material layer comprises an emission maximum at a first frequency of an edge of a photonic band, said photonic band being centered at a second frequency, wherein said thickness L is determined by the expression:

$$L = n\lambda/4,$$

wherein n is an integer and wherein $\lambda$ is a wavelength of light in said active material layer at said second frequency, and wherein said polarized lasing having a sign of rotation equivalent to said handedness of said chiral layer, occurs at said first frequency.

10. The chiral laser of claim 1, wherein said chiral layer is of a predefined thickness $L_{ch}$, and wherein said active material layer has an emission maximum at a third frequency and its thickness L is determined by the expression:

$$L = (n\lambda/4) + \lambda/8,$$

wherein n is an integer and wherein $\lambda$ is a wavelength of light in said active material layer at said third frequency, wherein said polarized lasing occurs at said third frequency, and wherein:
   when said thickness $L_{ch}$ is greater than a first predefined thickness, said polarized lasing comprises a sign of rotation opposite to said handedness of said chiral layer,
   when said thickness $L_{ch}$ is less than a second predefined thickness, said polarized lasing comprises a sign of rotation equivalent to said handedness of said chiral layer, and
   when said thickness $L_{ch}$ is less than said first predefined thickness and greater than said second predefined thickness, said polarized lasing comprises one of: elliptical polarization and linear polarization.

11. The chiral laser of claim 1, wherein said active material layer comprises:
   a bottom active material layer having a top portion and a bottom portion, disposed above said chiral layer, wherein said bottom active material layer bottom portion is in substantial contact with said chiral layer top portion; and
   a top quarter wave plate layer having a top portion and a bottom portion, disposed above said bottom active material layer, wherein said top quarter wave plate layer bottom portion is in substantial contact with said bottom active material layer top portion.

12. The chiral laser of claim 1, wherein said active material layer comprises:
   a bottom quarter wave plate layer having a top portion and a bottom portion, disposed above said chiral layer wherein said bottom quarter wave plate layer bottom portion is in substantial contact with said chiral layer top portion; and
   a top active material layer having a top portion and a bottom portion, disposed above said bottom quarter wave plate layer, wherein said top active material layer bottom portion is in substantial contact with said bottom quarter wave layer plate top portion.

13. A chiral laser apparatus comprising:
a layered structure comprising:
a chiral layer of a predetermined handedness having a top portion and a bottom portion and configured as a hole-transporting medium;
a quarter wave plate electro-luminescent layer of thickness L, a top portion and a bottom portion, and disposed above said chiral layer, wherein said electro-luminescent layer bottom portion is in substantial contact with said chiral layer top portion, and wherein said electro-luminescent layer is operable to:
(i) convert circularly polarized electromagnetic radiation passing therethrough to linearly polarized electromagnetic radiation, and
(ii) convert Linearly polarized electromagnetic radiation passing therethrough is to circularly polarized electromagnetic radiation;
a first electrode, disposed above said electro-luminescent layer, having electron source properties and a highly reflective bottom portion in substantial contact with said electro-luminescent layer top portion;
a second electrode, disposed below said chiral layer and in substantial contact with said chiral layer bottom portion, having hole source properties; and
excitation means, connected to said first and second electrodes, for applying excitation to said layered structure such that electron and hole recombination occurs in said electro-luminescent layer to produce polarized lasing directed through said second electrode.

14. The chiral laser of claim 13, wherein said electro-luminescent layer comprises:
a bottom electro-luminescent layer having a top portion and a bottom portion, disposed above said chiral layer, wherein said bottom electro-luminescent layer bottom portion is in substantial contact with said chiral layer top portion; and
a top quarter wave plate layer having a top portion and a bottom portion, disposed above said bottom electro-luminescent layer, wherein said top quarter wave plate layer bottom portion is in substantial contact with said bottom electro-luminescent layer top portion.

15. The chiral laser of claim 13, wherein said electro-luminescent layer comprises:
a bottom quarter wave plate layer having a top portion and a bottom portion, disposed above said chiral layer wherein said bottom quarter wave plate layer bottom portion is in substantial contact with said chiral layer top portion; and
a top electro-luminescent layer having a rap portion and a bottom portion, disposed above said bottom quarter wave plate layer, wherein said top electro-luminescent layer bottom portion is in substantial contact with said bottom quarter wave plate layer top portion.

16. The chiral laser of claim 13, wherein said electro-luminescent layer comprises at least one of: laser dyes, rare earth elements, conjugated polymers, and any medium in which electron-hole recombination occurs in an active material.

17. The chiral laser of claim 13, wherein said first electrode is composed of reflective aluminum.

18. The chiral laser of claim 13, wherein said second electrode is substantially transparent.

19. The chiral laser of claim 13, wherein said chiral layer is composed of a cholesteric liquid crystal material.

20. The chiral laser of claim 13, wherein said chiral layer is one of: right handed and left handed.

21. The chiral laser of claim 13, wherein said electro-luminescent layer comprises an emission maximum at a first frequency of an edge of a photonic band, said photonic band being centered at a second frequency, wherein said thickness L is determined by the expression:

$$L=n\lambda/4,$$

wherein n is an integer and wherein $\lambda$ is a wavelength of light in said electro-luminescent layer at said second frequency, and wherein said polarized lasing having a sign of rotation equivalent to said handedness of said chiral layer, occurs at said first frequency.

22. The chiral laser of claim 13, wherein said chiral layer is of a predefined thickness $L_{ch}$, and wherein said electro-luminescent layer has an emission maximum at a third frequency and its thickness L is determined by the expression:

$$L=(n\lambda/4)+\lambda/8,$$

wherein n is an integer and wherein $\lambda$ is a wavelength of light in said electro-luminescent layer at said third frequency, wherein said polarized lasing occurs at said third frequency, and wherein:
when said thickness $L_{ch}$ is greater than a first predefined thickness, said polarized lasing comprises a sign of rotation opposite to said handedness of said chiral layer,
when said thickness $L_{ch}$ is less than a second predefined thickness, said polarized lasing comprises a sign of rotation equivalent to said handedness of said chiral layer, and
when said thickness $L_{ch}$ is less than said first predefined thickness and greater than said second predefined thickness, said polarized lasing comprises one of: elliptical polarization and linear polarization.

23. A method of lasing in a chiral laser, comprising the steps of:
(a) providing a layered structure comprising;
a chiral layer of a predetermined handedness having a top portion and a bottom portion;
a quarter wave plate active material layer of a thickness L having and a top and bottom portion, configured to emit electromagnetic radiation when subjected to excitation and disposed above said chiral layer, wherein said active material layer bottom portion is in substantial contact with said chiral layer top portion, and wherein said active material layer is operable to: (i) convert circularly polarized electromagnetic radiation passing therethrough to linearly polarized electromagnetic radiation, and (ii) convert linearly polarized electromagnetic radiation passing therethrough is to circularly polarized electromagnetic radiation;
a reflector having a top and a bottom portion, configured to reflect said electromagnetic radiation, coming from said top portion of said active material layer, wherein said reflector bottom portion is in substantial contact with said active material layer top portion; and
(b) applying excitation to said layered structure to produce polarized lasing directed through said chiral layer in a direction away from said active material layer.

24. The lasing method of claim 23, wherein said active material layer is electro-luminescent, and wherein said reflector comprises a first electrode, further comprising the steps of:

(c) prior to said step (b), providing a second electrode, composed of a substantially transparent material, disposed below said chiral layer and in substantial contact with said chiral layer bottom portion; and wherein said step (b) further comprises the step of:
(d) delivering a charge current between said first and second electrodes to cause excitation in said active material layer.

25. The lasing method of claim 23, wherein said active material layer comprises at least one of: laser dyes, rare earth elements, conjugated polymers, and any medium in which electron-hole recombination occurs in an active material.

26. The lasing method of claim 23, wherein said first electrode is composed of reflective aluminum.

27. The lasing method of claim 23, wherein said chiral layer is composed of a cholesteric liquid crystal material.

28. The lasing method of claim 23, wherein said active material layer is optically excitable, further comprising the step of:
(e) delivering electromagnetic wave radiation to said active material layer to cause excitation therein.

29. The lasing method of claim 23, wherein said active material layer comprises at least one of: rare earth doped material, chelated rare earth doped material, semiconductor materials, organic light-emitting materials, conjugated polymers, dye-doped material, and materials containing color centers.

30. The lasing method of claim 23, wherein said active material layer comprises an emission maximum at a first frequency of an edge of a photonic band, said photonic band being centered at a second frequency, wherein said thickness L is determined by the expression:

$$L = n\lambda/4,$$

wherein n is an integer and wherein $\lambda$ is a wavelength of light in said active material layer at said second frequency, and wherein said polarized lasing having a sign of rotation equivalent to said handedness of said chiral layer, occurs at said first frequency.

31. The lasing method of claim 23, wherein said chiral layer is of a predefined thickness $L_{ch}$, and wherein said active material layer has an emission maximum at a third frequency and its thickness L is determined by the expression:

$$L = (n\lambda/4) + \lambda/8,$$

wherein n is an integer and wherein $\lambda$ is a wavelength of light in said active material layer at said third frequency, wherein said polarized lasing occurs at said third frequency, and wherein:

when said thickness $L_{ch}$ is greater than a first predefined thickness, said polarized lasing comprises a sign of rotation opposite to said handedness of said chiral layer, when said thickness $L_{ch}$ is less than a second predefined thickness, said polarized lasing comprises a sign of rotation equivalent to said handedness of said chiral layer, and when said thickness $L_{ch}$ is less than said first predefined thickness and greater than said second predefined thickness, said polarized lasing comprises one of: elliptical polarization and linear polarization.

32. A method of lasing, comprising the steps of:
(a) providing a layered structure comprising:
a chiral layer having a top portion and a bottom portion and configured as a hole-transporting medium;
a quarter wave plate electro-luminescent layer of thickness L having a top portion and a bottom portion, and disposed above said chiral layer, wherein said electro-luminescent layer bottom portion is in substantial contact with said chiral layer top portion, and wherein said electro-luminescent layer is operable to (i) convert circularly polarized electromagnetic radiation passing therethrough to linearly polarized electromagnetic radiation, and (ii) convert linearly polarized electromagnetic radiation passing therethrough is to circularly polarized electromagnetic radiation;
a first electrode, disposed above said electro-luminescent layer, having electron source properties and a highly reflective bottom portion in substantial contact with said quarter wave top portion;
a second electrode, disposed below said chiral layer and in substantial contact with said chiral layer bottom portion, having hole source properties; and
(b) applying a current between said first and second electrodes such that electron and hole recombination occurs in said electro-luminescent layer to produce lasing directed through said second electrode.

33. The method of lasing of claim 32, wherein said first electrode is composed of reflective aluminum.

34. The method of lasing of claim 32, wherein said second electrode is substantially transparent.

35. The method of lasing of claim 33, wherein said chiral layer is composed of a cholesteric liquid crystal material.

* * * * *